Patented July 22, 1947

2,424,510

UNITED STATES PATENT OFFICE 2,424,510

PRODUCTION OF β-NITROETHANOL AND β-NITROETHYL NITRATE

Arthur Ernest Wilder Smith, Charles William Scaife, and Robert Holroyd Stanley, Norton-on-Tees, England, assignors to Imperial Chemical Industries Limited, a corporation of Great Britain No Drawing. Application February 14, 1944, Serial No. 522,388. In Great Britain December 4, 1942

11 Claims. (Cl. 260—467)

1

This invention relates to the production of β-nitroethanol and β-nitroethyl nitrate.

In co-pending application Serial No. 450,141 there is described the reaction of nitrogen tetroxide and ethylene to produce 1:2-dinitroethane. When ethylene and nitrogen tetroxide are reacted together, an oil is also obtained which we have now found to contain β-nitroethyl nitrate. It is an object of this invention to provide a process whereby β-nitroethyl nitrate and β-nitroethanol can be obtained from the reaction product of ethylene and nitrogen tetroxide.

The process of the present invention comprises mixing the reaction product with water, allowing the mixture to separate into an aqueous layer and a non-aqueous layer, extracting β-nitroethanol from the aqueous layer by means of a suitable solvent, and distilling the non-aqueous layer to recover β-nitroethyl nitrate.

Although the reaction product may be mixed with water alone, a cleaner separation of β-nitroethanol and β-nitroethyl nitrate between the aqueous and non-aqueous layers can be obtained by mixing the reaction product with water and an aromatic hydrocarbon liquid, for example, benzene, toluene or a mixture of these compounds. On allowing the mixture to stand, it separates into an aqueous layer and a non-aqueous layer consisting of the aromatic hydrocarbon liquid in which is dissolved the β-nitroethyl nitrate.

Any nitrogen oxides, nitrous acid and nitric acid present in the crude reaction products will dissolve to a small extent in the non-aqueous layer, but principally in the aqueous layer, where it tends to increase the solubility of β-nitroethyl nitrate. It is therefore desirable to subject the crude reaction product to a preliminary treatment for the removal of excess nitrogen tetroxide, for example, by blowing air through it. During the extraction of the reaction product with water or a mixture of water and aromatic hydrocarbon liquid it is also desirable to raise the pH of the aqueous layer to between 4 and 7 at intervals by controlled additions of an alkali, in order to depress the solubility of β-nitroethyl nitrate in the aqueous layer. Since β-nitroethyl nitrate reacts with alkali, care must be taken not to add alkali to the aqueous layer in excess of the nitrogen oxides and acid present, nor to allow alkali to come into contact with the non-aqueous layer.

The crude reaction product contains 1:2-dinitroethane and when it is mixed with water, the 1:2-dinitroethane is largely taken up in the non-aqueous layer. It is advisable to remove the 1:2-dinitroethane from the non-aqueous layer prior to recovering the β-nitroethyl nitrate by distillation. If desired, after the addition of water to the crude reaction product, 1:2-dinitroethane may

2 be thrown out of solution by cooling and separated from the remaining liquid. The remaining liquid may then be treated as hereinbefore described for the separation of β-nitroethanol and β-nitroethyl nitrate, preferably after the addition of an aromatic hydrocarbon liquid, if water alone was originally added to the reaction product.

It is, however, more satisfactory to separate 1:2-dinitroethane from the crude reaction reaction product by a preliminary treatment before the addition of water. A preferred form of preliminary treatment for this purpose comprises dissolving the reaction product in an organic solvent, e. g., acetone, ether, methyl or ethyl alcohol, cooling to precipitate 1:2-dinitroethane, separating the precipitate, and removing the organic solvent from the remaining liquid which is then worked up as herein described for the isolation of β-nitroethanol and β-nitroethyl nitrate. The organic solvent should be inert to β-nitroethanol, β-nitroethyl nitrate and 1:2-dinitroethane under the conditions employed. Aromatic hydrocarbons such as benzene and toluene may be used for this purpose, in which event it is not necessary to separate the organic solvent from the remaining liquid reaction product after the removal of the 1:2-dinitroethane; solvents such as acetone, ether and the lower aliphatic alcohols are nevertheless to be preferred.

Alternatively the preliminary treatment for the removal of 1:2-dinitroethane may consist merely in precipitating the 1:2-dinitroethane by cooling the crude reaction product and then separating the precipitate from the remaining liquid.

Example 1

Nitrogen tetroxide was first purified by distillation in a stream of oxygen over phosphorus pentoxide. Into three litres of the liquid nitrogen tetroxide, ethylene and oxygen were passed until 246.6 litres of gas measured at normal temperature and pressure had been absorbed. During the absorption the liquid nitrogen tetroxide was maintained by an ice bath at about 0° C. The excess nitrogen tetroxide was then allowed to evaporate from the reaction product to which was added an equal volume of methanol. The resulting solution was then cooled by means of a mixture of methanol and solid carbon dioxide, whereby 1:2-dinitroethane was thrown out of solution and separated from the remaining liquid by filtration. The remaining liquid was then subjected to reduced pressure at room temperature so as to flash off the methanol, and the remaining oil was then shaken for 5 minutes with a mixture of 2 litres of benzene and 2 litres of water. The mixture was then allowed to stand, when two layers formed, a benzene layer and an aqueous layer. The aqueous layer was separated from the benzene layer, partially neutralised with soda ash, and then re-shaken with the benzene layer for a further hour. The aqueous layer was again separated, neutralised with soda ash using Congo red as indicator, and then re-shaken with the benzene layer for a further hour. This process was repeated until no further acidity developed in the aqueous layer, after which the two layers were separated, and the aqueous layer neutralised to a pH of 8. The benzene layer was then distilled to remove the benzene, after which the remaining oil was fractionally distilled under a pressure of 1 mm. of mercury, yielding 173 grams of $\beta$-nitroethyl nitrate. The aqueous layer was allowed to stand for a short while, and if required re-neutralised to pH 8, and then extracted with ether for 48 hours. The ether was then removed from the extract by distillation, and the remaining oil fractionally distilled at a pressure of 1 mm. of mercury, yielding 175 grams of $\beta$-nitroethanol.

*Example 2*

Ethylene and oxygen were passed into 3 kilograms of liquid nitrogen tetroxide until 226 litres of the gases measured at normal temperature and pressure had been absorbed. The excess nitrogen tetroxide was then removed from the reaction product, to which was then added 2 litres of water and the resulting mixture cooled in a bath of methanol and solid carbon dioxide. 1:2-dinitroethane was thereby precipitated and removed from the remaining liquid by filtration. The remaining liquid was then allowed to separate into a non-aqueous layer and an aqueous layer. The non-aqueous layer, after washing with water, was fractionally distilled at a pressure of 1 mm. of mercury, yielding 102 grams of $\beta$-nitroethyl nitrate. The aqueous layer was neutralised to a pH of 8 by means of soda ash, and extracted with ether for 48 hours. The ether was then distilled off from the ether extract, and the remaining oil fractionally distilled at a pressure of 1 mm. of mercury, yielding 96 grams of $\beta$-nitroethanol.

We claim:

1. A process for separating $\beta$-nitroethanol and $\beta$-nitroethyl nitrate from the reaction product of ethylene and nitrogen tetroxide comprising mixing the reaction produce with water, and allowing the mixture to separate into an aqueous layer containing $\beta$-nitroethanol and a non-aqueous layer containing $\beta$-nitroethyl nitrate.

2. A process for separating $\beta$-nitroethyl nitrate and $\beta$-nitroethanol from the reaction product of ethylene and nitrogen tetroxide comprising removing 1,2-dinitroethane from the reaction product, mixing the remainder with water and allowing the mixture to separate into an aqueous layer containing $\beta$-nitroethanol and a non-aqueous layer containing $\beta$-nitroethyl nitrate.

3. A process for separating $\beta$-nitroethanol and $\beta$-nitroethyl nitrate from the reaction product of ethylene and nitrogen tetroxide comprising mixing the reaction product with an aromatic hydrocarbon liquid and water, and allowing the mixture to separate into an aqueous layer containing $\beta$-nitroethanol and a non-aqueous layer containing $\beta$-nitroethyl nitrate.

4. A process as in claim 3 in which the aromatic hydrocarbon liquid contains benzene.

5. A process for separating $\beta$-nitroethanol and $\beta$-nitroethyl nitrate from the reaction product of ethylene and nitrogen tetroxide comprising cooling the reaction product to precipitate 1,2-dinitroethane, separating the precipitate from the remaining liquid, mixing the liquid with water, and allowing the mixture to separate into an aqueous layer containing $\beta$-nitroethanol and a non-aqueous layer containing $\beta$-nitroethyl nitrate.

6. A process for separating $\beta$-nitroethanol and $\beta$-nitroethyl nitrate from the reaction product of ethylene and nitrogen tetroxide comprising dissolving the reaction product in an organic solvent, cooling to precipitate 1,2-dinitroethane, separating the precipitate from the liquid, removing organic solvent from the liquid, mixing the liquid with an aromatic hydrocarbon liquid and water, and allowing the mixture to separate into an aqueous layer containing $\beta$-nitroethanol and a non-aqueous layer containing $\beta$-nitroethyl nitrate.

7. A process as in claim 6 in which the reaction product is dissolved in a solvent consisting of a lower aliphatic, neutral, oxygen containing compound.

8. A process for separating $\beta$-nitroethanol and $\beta$-nitroethyl nitrate from the reaction product of ethylene and nitrogen tetroxide comprising mixing the reaction product with water, cooling the mixture to precipitate 1,2-dinitroethane, removing the precipitate from the liquid, and allowing the liquid to separate into an aqueous layer containing $\beta$-nitroethanol and a non-aqueous layer containing $\beta$-nitroethyl nitrate.

9. A process for separating $\beta$-nitroethanol and $\beta$-nitroethyl nitrate from the reaction product of ethylene and nitrogen tetroxide comprising mixing the reaction product with water, cooling the mixture to precipitate 1,2-dinitroethane, removing the precipitate from the liquid, mixing the liquid with an aromatic hydrocarbon liquid, and allowing the mixture to separate into an aqueous layer containing $\beta$-nitroethanol and a non-aqueous layer containing $\beta$-nitroethyl nitrate.

10. A process for separating $\beta$-nitroethanol and $\beta$-nitroethyl nitrate from the reaction product of ethylene and nitrogen tetroxide comprising removing excess nitrogen tetroxide from the reaction product, dissolving the reaction product in an organic solvent, cooling to precipitate 1,2-dinitroethane, separating the precipitate from the liquid, removing the organic solvent from the liquid, mixing the liquid with an aromatic hydrocarbon liquid and water, and allowing the mixture to separate into an aqueous layer containing $\beta$-nitroethanol and a nonaqueous layer containing $\beta$-nitroethyl nitrate.

11. A process for separating $\beta$-nitroethanol and $\beta$-nitroethyl nitrate from the reaction product of ethylene and nitrogen tetroxide comprising dissolving the reaction product in an organic solvent, cooling to precipitate 1,2-dinitroethane, separating the precipitate from the liquid, removing organic solvent from the liquid, mixing the liquid with water, and allowing the mixture to separate into an aqueous layer containing $\beta$-nitroethanol and a non-aqueous layer containing $\beta$-nitroethyl nitrate.

ARTHUR ERNEST WILDER SMITH.
CHARLES WILLIAM SCAIFE.
ROBERT HOLROYD STANLEY.

REFERENCES CITED

The following references are of record in the file of this patent:

Wieland, Ber. Deut. Chem., vol. 53B, pp. 201-210 (1920).

Certificate of Correction

Patent No. 2,424,510.  July 22, 1947.

ARTHUR ERNEST WILDER SMITH ET AL.

It is hereby certified that errors appear in the printed specification of the above numbered patent requiring correction as follows: Column 2, line 9, strike out the word "reaction" first occurrence; column 3, line 49, claim 1, for "produce" read *product*; and that the said Letters Patent should be read with these corrections therein that the same may conform to the record of the case in the Patent Office.

Signed and sealed this 2nd day of September, A. D. 1947.

[SEAL]

LESLIE FRAZER,
*First Assistant Commissioner of Patents.*